US005158982A

United States Patent [19]

Stapp

[11] Patent Number: 5,158,982

[45] Date of Patent: Oct. 27, 1992

[54] CONVERSION OF MUNICIPAL WASTE TO USEFUL OILS

[75] Inventor: Paul R. Stapp, Bartlesville, Okla.

[73] Assignee: IIT Research Institute, Chicago, Ill.

[21] Appl. No.: 771,732

[22] Filed: Oct. 4, 1991

[51] Int. Cl.[5] .............................................. C08J 11/04

[52] U.S. Cl. ........................................ 521/41; 521/48; 208/15; 208/16; 208/17; 208/18; 585/241

[58] Field of Search ....................... 521/48, 41; 208/15, 208/16, 17, 18; 585/241

[56] References Cited

U.S. PATENT DOCUMENTS

| | | | |
|---|---|---|---|
| 3,947,256 | 3/1976 | Tsukagoshi et al. | 585/241 |
| 4,118,281 | 10/1978 | Yan | 521/47 |
| 4,642,401 | 2/1987 | Coenen et al. | 585/241 |
| 5,095,040 | 3/1992 | Ledford | 521/41 |

*Primary Examiner*—Paul R. Michl
*Assistant Examiner*—Olga Asinovsky
*Attorney, Agent, or Firm*—Fitch, Even, Tabin & Flannery

[57] ABSTRACT

The present invention is directed to a method for converting municipal waste containing plastics to a high quality synthetic crude oil which can be separated by fractionation into gasoline, diesel fuel and gas oils suitable as a feedstock to a catalytic cracker. The presence of cellulosic and proteinaceous waste materials in the municipal waste does not inhibit the process of the invention for converting the municipal waste into a synthetic crude oil. The process generally includes the steps of heating the municipal waste in a reaction gas, of a mixture of hydrogen sulfide and hydrogen or hydrogen at moderate temperatures and pressures.

14 Claims, No Drawings

CONVERSION OF MUNICIPAL WASTE TO USEFUL OILS

FIELD OF THE INVENTION

The present invention is directed to a process for converting polymeric containing municipal waste to an oil feedstock. More particularly, the present invention is directed to a process for treating municipal waste containing polymeric waste materials wherein the polymeric waste is broken down into liquid hydrocarbon materials having a boiling point below about 1,000° F.

BACKGROUND OF THE INVENTION

Polymeric materials, referred to hereinafter by the generic term "plastics", account for about 7% of municipal solid waste and up to about 20% of the waste by volume. This amounts to about 10 to about 12 million tons per year in the United States. Although plastics recycling is increasing, reprocessing and recycling generally requires segregation by type of plastic. Consumers, in general, and reprocessors often have no idea as to the composition of individual plastic articles. Consequently, processes for utilization of mixed plastic waste, particularly polystyrene, polypropylene and polyethylene, are urgently needed. The present invention provides a process for conversion of mixed plastic waste materials to a high quality synthetic crude oil which can be separated by fractionation into gasoline, diesel fuel and gas-oil components suitable as a feedstock to a catalytic cracker without additional treatment. As used herein, the term "municipal waste" includes all forms of polymeric containing waste materials which require or will benefit from recycling, including processing scrap, municipal waste and recovered or recycled polymeric materials.

U.S. Pat. No. 4,724,068 to Stapp describes a process for hydrotreating hydrocarbon-containing feed streams, especially heavy oils. The process of the Stapp patent utilizes a polymeric treating agent for upgrading the composition of heavy oils. In accordance with the process, an upgrading process is provided comprising the step of contacting (a) a substantially liquid hydrocarbon-containing feed stream substantially simultaneously with (b) free hydrogen, (c) hydrogen sulfide and (d) at least one polymer selected from the group consisting of homopolymers and copolymers of olefinic monomers, in the substantial absence of a solid, inorganic cracking catalyst and a solid inorganic hydroconversion catalyst. The process is performed under conditions so as to obtain a product stream having higher $API_{60}$ gravity and having a lower content of hydrocarbons boiling above 1000° F. than the feed stream.

In accordance with the process of the Stapp patent, impurities contained in the hydrocarbon-containing feed stream are at least partially converted to a "sludge", i.e., a precipitate of metals and coke, which is dispersed in the liquid portion of the hydrocarbon-containing product stream. The sludge and the dispersed olefin polymers are then separated from the liquid portion of the hydrocarbon-containing product stream by any suitable separation means, such as distillation, filtration, centrifugation or settling and subsequent draining of the liquid phase. The hydrocarbon-containing product stream has an increased $API_{60}$ gravity and lower content of heavy fractions. The weight ratio of olefin polymer to hydrocarbon-containing feed is described as being generally in the range of from about 0.01:1 to about 5:1, preferably from about 0.02:1 to about 1:1 and more preferably from about 0.05:1 to about 0.5:1. The Stapp patent generally describes a procedure for hydrovisbreaking a heavy oil with a mixture of hydrogen and hydrogen sulfide in the presence of olefin polymers followed by recovery of an improved hydrocarbon oil product after separation from the olefin polymers.

SUMMARY OF THE INVENTION

It has now been found that municipal waste containing plastics can be directly converted to a high quality synthetic crude oil which can be separated by fractionation into gasoline, diesel fuel and gas oils suitable as a feedstock to a catalytic cracker. The presence of cellulosic and proteinaceous waste materials in the municipal waste does not inhibit the process of the invention for converting the municipal waste into a synthetic crude oil. The process generally includes the steps of heating the municipal waste in a reaction gas of a mixture of hydrogen sulfide and hydrogen or hydrogen atmosphere at moderate temperatures and pressures.

DETAILED DESCRIPTION OF THE INVENTION

The present invention is directed to a process for converting municipal waste containing polymeric materials to an oil feedstock. In the method, a reaction mixture of municipal waste is provided in a pressurized reaction vessel provided with stirring means, such as a stirred, pressurized autoclave. The municipal waste is contacted in the reaction vessel with a gas atmosphere selected from hydrogen and mixtures of hydrogen and hydrogen sulfide. The municipal waste is heated in the reaction vessel to a temperature in the range of from about 350° C. to about 450° C. at a pressure of from about 500 psig to about 5,000 psig, preferably from about 750 psig to about 3,000 psig. for a time sufficient to convert the polymeric materials to liquid hydrocarbon materials having a boiling point below about 1000° F., which time is generally in the range of from about 15 minutes to about 8 hours, preferably from about 30 minutes to about 4 hours. Cellulosic materials, such as newspaper and cardboard, are also substantially converted to a synthetic crude. If large quantities of nitrogen containing materials are present in the feed, some nitrogen will be found in the synthetic crude oil. This presents no problem to the refiners, since nitrogen can be readily removed with existing hydrotreaters. An additional feature of this process is that extraneous organic material such as garbage, wood waste, grass clippings, waste lubricating oil, animal waste from the food industry, etc., will also be converted to a premium synthetic crude oil in high yields.

The process of the present invention is suitable for conversion of a wide range of plastic waste feedstocks found in municipal waste. Suitable plastic materials include polystyrene, polypropylene, medium density polyethylene, high density polyethylene, polyisoprene, styrene-butadiene copolymer, styrene-ethylene-butylene copolymer, polyethylene terephthalate, polyvinyl chloride and polyamides with the proviso that the high density polyethylene content should be limited to no more than about 25% by weight of the mixture of plastic waste materials at operating temperatures of less than about 400° C. and operating times of less than about 2 hours. All percentages used herein are by weight, unless otherwise indicated. It is estimated that municipal waste contains about 8% halogenated polymers on average. Accordingly, if it is known that the polymeric waste includes a halogenated polymer, such as polyvinyl chloride, it is desirable to include a basic material, such as calcium carbonate to neutralize any halogen acids that are formed.

The municipal waste materials may be comminuted to provide particles of waste prior to introduction into the reaction vessel. After the municipal waste particles are charged into the reaction vessel, the reaction vessel is closed, stirring is initiated and the reaction vessel is pressurized with a reaction gas selected from hydrogen and mixtures of hydrogen and hydrogen sulfide. The reaction gas is preferably a mixture of hydrogen and hydrogen sulfide with a ratio of hydrogen sulfide to hydrogen of from about 0:1 to about 1:1, based on pressure.

For some applications, it is desirable to include from about 15% to about 75% of crude oil or used lubricating oil in the charge. The oil serves as a carrier for the waste. The oil is also substantially upgraded in the reaction vessel to provide an oil stock having a boiling point of less than about 1000° F.

A soluble catalyst can also be added to the municipal waste in the reaction vessel. Suitable catalysts include molybdenum octoate, molybdenum acetyl acetonate, molybdenum hexacarbonyl and molybdenum napthanate. When used, the catalyst is preferably added at a level sufficient to provide from about 10 ppm to about 5,000 ppm of molybdenum.

For oxygenated feedstocks such as cellulosics and oxygen containing polymers, it is preferred to use a catalyst and a hydrogen/hydrogen sulfide atmosphere. While not wishing to be bound by any theory, it is believed that sulfur replaces the oxygen in the oxygenated polymers and that the sulfur is hydrogenated to form the hydrocarbon.

Waste materials which have been converted to a synthetic crude oil by this process include newspapers, Kraft paper, grass clippings, wax-coated paper milk bottles, cheeseburgers (including the bun and wrapping paper), french fries (including the cardboard carton), coffee grounds and lard. The process consists of heating the feed with either hydrogen sulfide and hydrogen or hydrogen alone, optionally in the presence of an oil soluble molybdenum catalyst such as molybdenum octoate or molybdenum napthenate, in an autoclave at temperatures ranging from about 385° C. to 415° C. for 1 to 4 hours. High yields of liquid products are obtained consisting principally of gasoline and diesel range hydrocarbons. In general, the combination of hydrogen sulfide-hydrogen in conjunction with molybdenum octoate catalyst gives the highest liquid yields and lowest coke yields. A small amount of water is always produced in these experiments involving oxygen containing feedstocks. It is believed, but certainly not proven, that under the conditions of the experiment, oxygen is displaced by hydrogen sulfide to form water and organic sulfides which are then reduced to hydrocarbons.

A range of synthetic municipal waste material feedstocks were tested utilizing temperatures in the range of 385° C. to 415° C. The municipal waste materials were first converted to particles by use of suitable comminuting apparatus. The particles were introduced into a stirred autoclave, the autoclave was sealed and hydrogen pressures were developed in the range of 1400/1500 psig. Table 1 summarizes the results of heating the various combinations of simulated municipal waste materials under hydrogen atmospheres in the stirred autoclave.

TABLE 1

Conversion of Municipal Solid Wastes to Synthetic Crudes

| Run | Gas | Temp °C. | Time Hours | Feed | Oil Yield | Coke Yield |
|---|---|---|---|---|---|---|
| A56-47 | $H_2S$—$H_2$ | 415 | 1¼ | NP 22.1%, Hondo Crude Oil 77.9% | 59.6% | 14.7% |
| A560-127 | $H_2$ | 385 | 4 | NP 13.7, Hondo 57.8, PS 28.5 | 82.2 | 3.4 |
| A560-129 | $H_2$ | 385 | 4 | NP 14.2, Hondo 50.9, PS 35.0 | 80.9 | 3.8 |
| A560-131 | $H_2S$—$H_2$ | 385 | 4 | NP 13.1, Hondo 49.0, PS 37.9 | 89.9 | 1.6 |
| A560-133 | $H_2S$—$H_2$ | 385 | 4 | NP 14.3, PS 46.0, PP 39.7 | 91.5 | 1.1 |
| A560-147 | $H_2$ | 385 | 4 | NP 14.2, Hondo 52.4, PS 33.4 | 69.8 | 9.8 |
| A560-149 | $H_2S$—$H_2$ | 385 | 4 | NP 13.5, Hondo 49.0, PS 37.5 | 80.7 | 8.1 |
| A598-27 | $H_2S$—$H_2$ | 385 | 4 | NP 16.9, PS 44.7, PP 38.3 | 82.8 | 4.5 |
| A598-29 | $H_2$ | 385 | 4 | NP 16.9, PS 44.7, PP 38.3 | 74.7 | 9.6 |
| A598-31 | $H_2S$—$H_2$ | 385 | 4 | NP 17.0, PS 44.6, PP 38.4 | 85.6 | 5.0 |
| A598-35 | $H_2S$—$H_2$ | 385 | 3 | NP 16.8, PS 83.2 | 84.8 | 2.0 |
| A598-37 | $H_2S$—$H_2$ | 385 | 3 | NP 16.1, PP 83.9 | 85.6 | 3.1 |
| A598-51 | $H_2S$—$H_2$ | 415 | 3 | NP 16.5, PP 45.3, PE 38.2 | 64.6 | 7.3 |
| A598-7 | $H_2S$—$H_2$ | 385 | 3 | PS 65.3, CB 33.9, Paper 0.8 | 85.3 | 1.5 |
| A598-9 | $H_2S$—$H_2$ | 385 | 3 | PS 63.7, FF 34.4, Cardboard 2.0 | 81.2 | 5.9 |
| A598-11 | $H_2S$—$H_2$ | 385 | 3 | PS 64.4, CB 34.9, Paper 0.7 | 83.3 | 3.1 |
| A598-21 | $H_2S$—$H_2$ | 385 | 3 | PS 64.5, CB 34.8, Paper 0.7 | 80.3 | 7.1 |
| A598-23 | $H_2S$—$H_2$ | 385 | 3 | PS 64.4, CB 34.9, Paper 0.7 | 84.1 | 4.6 |
| A598-25 | $H_2$ | 385 | 3 | PS 64.5, CB 34.8, Paper 0.7 | 75.4 | 8.8 |
| A598-33 | $H_2S$—$H_2$ | 385 | 3 | PS 33.3, PP 33.3, CG 33.3 | 79.3 | 5.0 |
| A598-67 | $H_2S$—$H_2$ | 385 | 3 | PS 38.9, PP 38.9, MC 22.2 | 74.3 | 15.8 |
| A598-69 | $H_2S$—$H_2$ | 385 | 3 | PS 44.6, PP 38.2, KP 17.2 | 83.8 | 2.7 |
| A598-71 | $H_2S$—$H_2$ | 385 | 3 | PS 33.1, PP 33.0, Lard 33.9 | 87.5 | 0.1 |
| A626-77 | $H_2S$—$H_2$ | 385 | 3 | PS 79.3, Bermuda Grass Clip 20.7 | 94.9 | — |

| Run | API Gravity | Carbon Residue | IBP-400° F. | 400°-850° F. | 650°-1000° F. | 1000°+ | End Point °F. | MO Octoat Catalyst |
|---|---|---|---|---|---|---|---|---|
| A56-47 | 30.2 | 2.2% | ND | ND | ND | ND | ND | No |
| A560-127 | 23.2 | 6.3 | 45.0 | 22.0 | 23.0 | 10.0 | — | Yes |
| A560-129 | 23.2 | 6.2 | 53.4 | 21.9 | 22.1 | 2.6 | — | Yes |
| A560-131 | 23.8 | 5.1 | 47.5 | 22.0 | 20.9 | 9.6 | — | Yes |
| A560-133 | 35.7 | 0.3 | 66.5 | 23.7 | 9.8 | — | 764 | Yes |
| A560-147 | 23.0 | 6.5 | 54.0 | 19.8 | 20.2 | 6.0 | — | No |
| A560-149 | 22.5 | 7.0 | 55.0 | 18.9 | 19.6 | 6.0 | — | No |
| A598-27 | 30.9 | 2.2 | 62.9 | 18.8 | 18.3 | 1.0 | — | No |

TABLE 1-continued

Conversion of Municipal Solid Wastes to Synthetic Crudes

| | | | | | | | | |
|---|---|---|---|---|---|---|---|---|
| A598-29 | 32.8 | 2.8 | 60.7 | 21.5 | 17.8 | — | 918 | Yes |
| A598-31 | 33.6 | 0.8 | 64.3 | 20.3 | 15.4 | — | 915 | Yes |
| A598-35 | 15.4 | 2.9 | 71.3 | 10.0 | 18.7 | — | 793 | Yes |
| A598-37 | 47.4 | 0.2 | 42.2 | 33.1 | 32.4 | 1.3 | — | Yes |
| A598-51 | 46.0 | — | 43.3 | 21.7 | 23.5 | 11.5 | — | Yes |
| A598-7 | 19.2 | 3.4 | 74.5 | 17.9 | 7.6 | — | 720 | Yes |
| A598-9 | 22.6 | 4.4 | 66.8 | 12.8 | 15.4 | 5.0 | — | Yes |
| A598-11 | 18.5 | 5.2 | 59.7 | 13.6 | 20.7 | 6.0 | — | Yes |
| A598-21 | 18.6 | 3.5 | 64.0 | 12.7 | 20.3 | 3.0 | — | Yes |
| A598-23 | 16.1 | 6.4 | 60.5 | 9.2 | 22.3 | 8.0 | — | No |
| A598-25 | 16.1 | 3.6 | 52.6 | 11.0 | 14.4 | 22.0 | — | No |
| A598-33 | 27.8 | — | 44.3 | 23.2 | 26.5 | 6.0 | — | Yes |
| A598-67 | 35.2 | — | 51.4 | 22.5 | 15.1 | 11.0 | — | Yes |
| A598-69 | 33.4 | — | 60.2 | 24.6 | 15.2 | — | 814 | Yes |
| A598-71 | 39.8 | — | 38.5 | 42.4 | 16.1 | 3.0 | — | Yes |
| A626-77 | 19.7 | 1.9 | 66.4 | 16.7 | 16.9 | — | 808 | Yes |

NP = Newspaper, PS = Polystyrene, PP = Polypropylene, PE = Polyethylene, CB = Cheeseburger, FF = French Fries, CG = Coffee Grounds, MC = Milk Carton, KP = Kraft Paper
ND = Not Determined From the above Table, it should be noted that newspapers (cellulosics) are not rejected to coke and are incorporated into the final synthetic crude product. It is true that a slightly larger amount of coke is produced when cellulosics are part of the charge, but most of this is converted to oil. For example, the runs with 35% cheeseburger, 35% french fries and 35% coffee grounds give oil yields far in excess of the amount of polymer charged. Similarly run A598-71 with 33.9% lard and A560-133 with 14.3% newspaper gives yields greatly in excess of the amount of charged plastics.

It is also within the scope of this invention to recycle any gas oils (b.p. 650°-1000° F.) and resids (b.p.>1000° F.) back into the reaction vessel and reprocess them with additional polymeric waste to provide gasoline and diesel range hydrocarbon materials.

The present invention describes a simple process to convert mixed municipal waste plastics to a synthetic crude oil which would be highly useful as a feedstock for a refinery. The amount of coke that is produced is reasonable and the coke produced contains minimal heteroatoms. The coke could therefore be used as a fuel to supply process heat. The hydrocarbon products contain no sulfur, oxygen, nitrogen or metals and would be suitable refinery feedstocks, when hydrogen alone is used. Sulfur is introduced when mixtures of hydrogen and hydrogen sulfide are used. The presence of sulfur poses no problem to refiners and existing refinery equipment can be used to handle sulfur containing feedstocks. If, for example, the octane number of the gasoline is too low, it could be reformed or isomerized without the hydrotreating that is normally required for petroleum napthas, provided that hydrogen sulfide is not used in the reaction gas. Similarly, diesel oil obtained from the process would be expected to have a high cetane number, particularly diesel oil produced from polyethylene. Such diesel oil would not require hydrotreating for sulfur removal if hydrogen sulfide is not used in the reaction gas. Gas oils and residues contain no heteroatoms and would be suitable cat cracker feedstocks without prior hydrotreating or demetalization. The process of the present invention could readily use a mixed plastic separated by gravity segregation from municipal solid waste.

If oxygenates or nitrogen-containing compounds are in the feed, it is necessary to use mixtures of hydrogen sulfide and hydrogen to get good yields of liquids. These products contain some nitrogen and sulfur, therefore, hydrotreating will be required before isomerization or reforming, and the diesel oil will contain sulfur. This presents no problems for refiners because almost all crude oils contain sulfur and many contain small amounts of nitrogen, and refiners know how to handle those compounds. It is believed that the coke that is produced also contains small amounts of oxygen, nitrogen and sulfur, but it has not been analyzed.

What is claimed is:

1. A method for converting municipal waste containing plastic materials to an oil feedstock comprising
(a) charging municipal waste into a reaction vessel,
(b) contacting said municipal waste in said reaction vessel with a gas atmosphere selected from hydrogen and mixtures of hydrogen and hydrogen sulfide, and
(c) heating said reaction mixture to a temperature in the range of from about 350° C. to about 450° C. for a time sufficient to convert organic materials in said municipal waste to liquid hydrocarbon materials having a boiling point below about 1000° F.

2. A method in accordance with claim 1 wherein said municipal waste is fed to said reaction vessel in the form of particles.

3. A method in accordance with claim 1 wherein said municipal waste is fed to said reaction vessel in the form of melted polymer.

4. A method in accordance with claim 1 wherein the said polymeric waste in said municipal waste is selected from the group consisting of polystyrene, polypropylene, medium density polyethylene, high density polyethylene, polyisoprene, styrene-butadiene copolymer, styrene-ethylene-butylene copolymer, polyethylene terephthalate, polyvinyl chloride and polyamides.

5. A method in accordance with claim 1 wherein said gas atmosphere is maintained at a pressure of from about 500 psig to about 5,000 psig during said contacting step.

6. A method in accordance with claim 1 wherein said gas atmosphere is maintained at a pressure of from about 750 psig to about 3,000 psig during said contacting step.

7. A method in accordance with claim 1 wherein said contacting is for a period of from about 15 minutes to about 8 hours.

8. A method in accordance with claim 1 wherein said contacting is for a period of from about 30 minutes to about 4 hours.

9. A method in accordance with claim 1 wherein a catalyst is present during said contacting step.

10. A method in accordance with claim 9 wherein said catalyst is selected from molybdenum octoate, molybdenum acetyl acetonate, molybdenum hexacarbonyl and molybdenum napthanate.

11. A method in accordance with claim 1 wherein said gas atmosphere has a hydrogen sulfide to hydrogen ratio of from 0:1 to about 1:1, based on pressure.

12. A method in accordance with claim 1 wherein said contacting step takes place on a batch basis.

13. A method in accordance with claim 1 wherein said contacting step takes place on a continuous basis.

14. A method in accordance with claim 1 wherein said charge to said reaction vessel also comprises crude oil.

* * * * *